United States Patent [19]

Palma

[11] 4,129,787
[45] Dec. 12, 1978

[54] DOUBLE WIND TURBINE WITH FOUR FUNCTION BLADE SET

[76] Inventor: Florencio N. Palma, 263 Keele St., Toronto, Canada

[21] Appl. No.: 788,798

[22] Filed: Apr. 19, 1977

[51] Int. Cl.² ............................................. F03D 7/06
[52] U.S. Cl. .................................... 290/55; 416/119; 416/111; 290/44
[58] Field of Search ................. 416/111, 119; 290/55, 290/54, 43, 44

[56] References Cited
FOREIGN PATENT DOCUMENTS
929721  1/1948  France ..................................... 416/111

Primary Examiner—Robert K. Schaefer
Assistant Examiner—John W. Redman
Attorney, Agent, or Firm—Kerry Maxwell Hill

[57] ABSTRACT

A free standing, vertical axis rotor employs both fixed and pivoted airfoil blades assembled on a triangular rotor frame. The angle of attack of the pivoted blades is controlled with reference to the prevailing winds. The rotor base terminates on a ring shaped tower mounted on guiding wheels disposed in a circular pattern on pillars. The revolving ring shaped base forms the armature of an energy converter by electromagnetic induction allowing thereby the conversion of rotary motion to electric energy at ground level.

7 Claims, 5 Drawing Figures

4,129,787

DOUBLE WIND TURBINE WITH FOUR FUNCTION BLADE SET

BACKGROUND OF THE INVENTION

1. Field of the Invention

The present invention relates to a wind powered turbine of the vertical-axis type for use in large configurations.

In particular, the invention herein contemplates the provision of a self-starting, free-standing, vertical-axis type rotor which employs both fixed and pivoted airfoil blades, assembled on a triangular rotor frame. The angle of attack of the pivoted blades is monitored and controlled in reference to the prevailing winds for improved aerodynamic efficiency. RPM control and arrest of operation by aerodynamic means is also provided by a controller operating the pivoted blades, permitting the turbine to operate in very high wind speeds. The rotor base teminates on a ring shaped tower mounted on guiding wheels, disposed in a circular pattern on pillars. The revolving ring shaped tower base, forms the armature of an energy converter by electromagnetic induction, allowing the rotary energy to be harnassed directly, at ground level on a stationary installation thereby limiting the weight to be carried by the rotating turbine.

2. Prior Art

The Darrieus rotor under development by the National Research Council in Canada and Sandia Laboratories in the U.S.A. is a vertical-axis rotor employing airfoil blades bent into a catenary shape and using electric motors or Savonious rotor starting. While simple, the prior methods lack versatility and aerodynamic efficiency. The feasibility of scaling-up to super giant turbines is not possible with known types of vertical-axis turbines.

The Gironmill concept employing symetrical blades of constant chord, which are flipped from a positive to a negative orientation at diametrically opposite points, requires strong winds to start, is difficult to operate at constant RPM and is less efficient than the Darrieus rotor. Giromills do not permit scaling-up to large individual installations.

The Vortex-turbine concept is a complex structure, which requires considerable amounts of material and labor, offers an enormous impact surface of the wind forces and could therefore prove relatively vulnerable and uneconomical.

The propeller, is a horizontal-axis device of good aerodynamic efficiency, but it requires a tall tower and orientation into the wind, consequently, it is not comparatively feasible for large scale energy conversion.

SUMMARY OF THE INVENTION

It is an object of the present invention to provide a self-starting, free-standing, vertical-axis turbine capable of starting in low wind speeds. The turbine herein starts as a drag-type rotor in which the pivoted blades are switched from on to off to on until sufficient speed is achieved. The pivoted blades are next aligned for lift type operation, allowing the turbine to speed-up to a high velocity. I provide a control means to the pivoted airfoil blades in response to signals produced by propeller anemometers mounted directly in line with the individual pivoted airfoils, to provide a signal for pitch control of the pivoted blades in phase with the prevailing winds.

A further object is to provide a rotor frame which permits the building of large scale wind turbines and form a giant electromagnetic energy converter in which a ring shaped tower base forms a revolving armature common to a number of plug-in individual stators disposed adjacently to it in a circular pattern, for transfer of the energy by electromagnetic induction at ground level. An alternate method of coupling the energy is to directly couple the energy converters to individual guiding wheel shafts.

A further object is to provide a controller for allowing precise control of the turbine and switching of the individual energy converters in reference to the prevailing winds. The controller features a selection of Manual, Automatic and radio control signals by means of a transceiver, allowing the turbine to be monitored and controlled by radio from great distances, such as would be possible by a central computer and a satelite channel supervising a number of large wind turbines scattered over a wide area.

It is further contemplated that the turbine herein can be used for hydraulic applications. The turbine structure herein allows large diameter turbines to be built where the length of the blades may be chosen to suit the application.

BRIEF DESCRIPTION OF THE DRAWINGS

An embodiment of the invention will now be described by way of example with reference to the accompanying drawings in which.

THE PREFERRED EMBODIMENT

Figure 1:
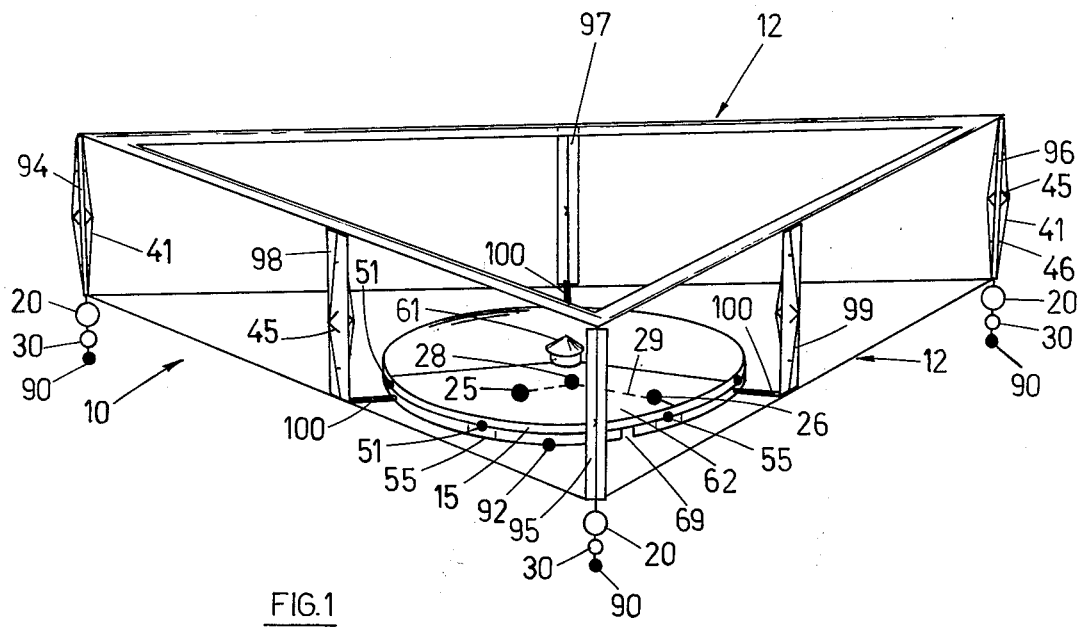
FIG. 1 is a partly schematic illustration of a turbine rotating tower showing the disposition of the fixed blades, the pivoted blades and the ground level circular armature and wheeled, tracked base means.

The turbine is generally designated 10 in FIG. 1, and consists of pivoted airfoil blades 94, 95, 96 and fixed airfoil blades mounted on the equilateral frame generally designated 12, which is assembled on a ring shaped rotating tower 15. The ring shaped rotating tower 15, rotates on guiding roller 51, mounted on pillars 55. A conic roof 62, shields the electromagnetic energy converters and control room 25 and forms a large circular compartment. Vent 61, allows the heat generated by the energy converters to escape. 69 is an entrance door to the circular compartment formed by the shielded rotating tower base. Circles 20, represent electric servo motors with a clutch and gear reducer to permit pitch control of the pivoted airfoil blade 94, 95, 96 in response to control signals provided by the controller 25. Circles 30, represent propeller anemometers oriented to act in the direction of rotation, by being mounted on rigid frames in line with the pivoted airfoil blades 94, 95, 96 to provide controller 25 with wind speed and pitch control information. Circles 90 represent pitch reference servos, such as servomechanisms to indicate the relative position of the pivoted blades. Circle 26 represents a tachometer to provide controller 25 with the RPM of the tower.

28 is a rotary coupling consisting of rings and brushes mounted at the center of the rotating tower, allowing coupling of the servo motors 20, anemometers 30 and pitch reference servos 90, to controller 25, by means of cable 29, which also interconnects tachometer 26, coupled to the rotating tower 15. It is contemplated that Controller 25 will permit the individual stators 65 depicted in FIG. 4, and such parameters as: power output, voltage, frequency and switching ON and OFF electrically of the system, to be monitored and controlled.

Figure 2:
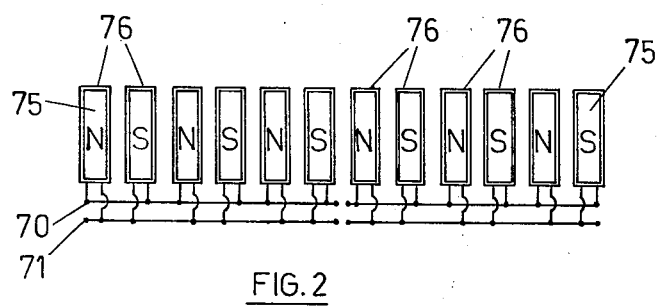
FIG. 2 shows a number of induction coils connected in parallel and wound to form north poles adjacent to south poles, with a D.C. voltage connected to the segmented collectors, by means of roller brushes to form large ring shaped armature, common to a number of individual stators.
Figure 3:
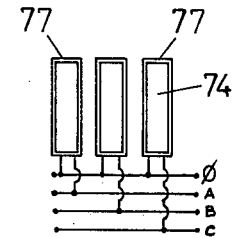
FIG. 3 shows a typical coil arrangement of adjacent individual stators to produce three phases, in which the revolving armature's magnetic field will electromagnetically induce energy for transfer.

Bilateral stress dampers 41, are metalic bands designed to supress the centrifugal and aerodynamic stresses exerted on the airfoil blades. The V-shaped brackets 45 and straight brackets 46, together with bilateral stress dampers 41, form a rigid blade structure to supress blade flutter. Coils 76 in FIG. 2 are wound around magnetic poles 75, so as to form north poles adjacent to south poles. A number of these coils may be connected in parallel by segmented collectors 70 and 71. Coils 77 of FIG. 3, are wound around magnetic poles 74 and are connected so as to produce a desired number of phases.

Figure 4:
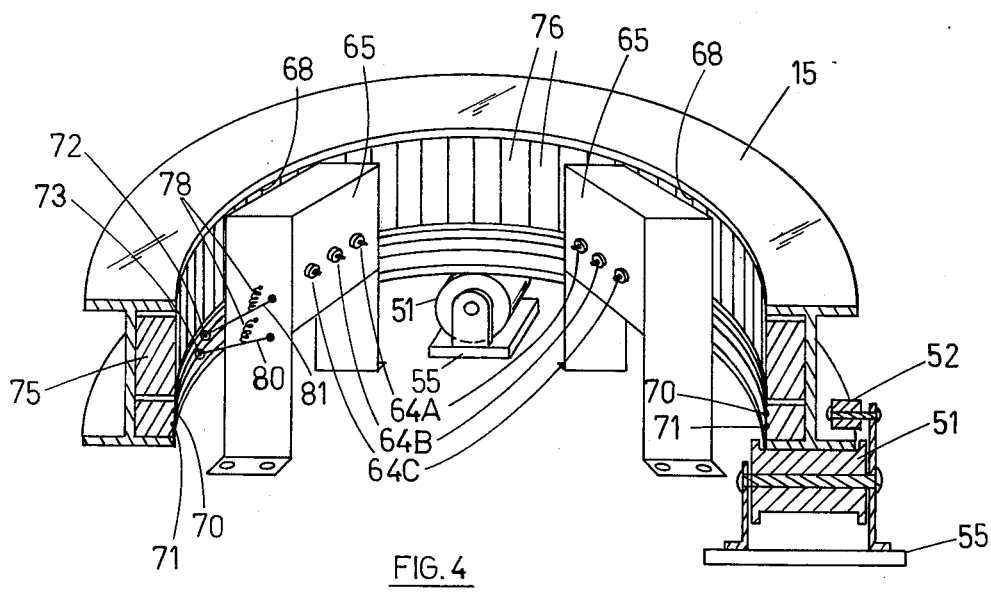
FIG. 4 is an assembly in section of the ring shaped rotating tower base mounted on guiding rollers, containing the induction coils and magnetic poles.

A section of the ring shaped tower base 15, is shown in FIG. 4, forming a giant ring shaped armature, in which the coils 76 and poles 75 and segmented collector rings 70 and 71 are assembled. A D.C. voltage is coupled to the segmented rings 70 and 71 by means of roller brushes 72 and 73 and poles 80 and 81, mounted in each individual stator module 65, sitting adjacently to the revolving armature 15, separated by a gap 68. Springs, 78, ensure contact pressure of the roller brushes. The armature 15, rotates on guiding rollers 51 mounted on pillars 55. Clamping rollers 52 prevent the rotating tower base from tilting and ensures smoothness of operation.

Figure 5:
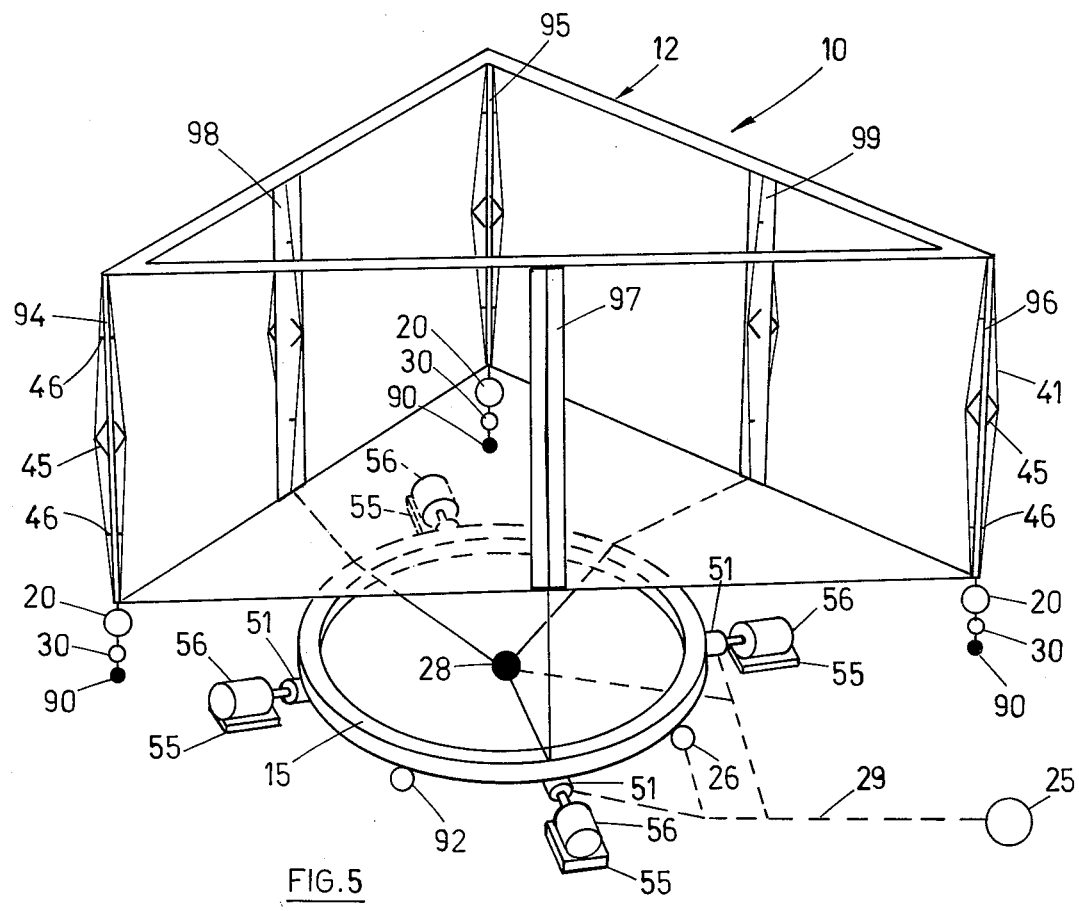
FIG. 5 is a schematic depiction of an alternative method of coupling the rotating tower to a variety of energy converters.

The drawings in FIG. 5, depict an alternative method of coupling of the basic turbine concept, to a variety of energy converters 56, to the individual shafts of guiding wheels 51, permitting simultaneous conversion of the energy in various forms directly. Clutches operated by controller 25, permit switching of the individual energy converters ON and OFF to obtain the desired RPM of operation.

The pivoted airfoil blades are shown aligned with the direction of the wind current 60, to offer a minimum impact surface while the turbine is inoperative. A brake 92, may be applied to the rotating tower 15, while the turbine is inoperative to lock it in a stationary position.

MODE OF OPERATION

The turbine rotor herein consists of two turbine rotors in one. The three fixed airfoil blades 97, 98, 99 form a rotor in which the blades sit at mid distance from the center, and form a tower to support the upper triangular frame through struts 100.

The second rotor, is formed by the pivoted airfoil blades 94, 95, 96 mounted at the vertices of the equilateral triangular rotor frame 12. The pivoted airfoil blades form a variable geometry rotor for improved aerodynamic means. The airfoil blades being straight, permit the conversion of more energy for a given length of blade in comparison to blades sent into a catenary shape. The feasibility of using straight blades arises from the application of bilateral stress dampers 41, which with V-shaped brackets 45 and straight bracket 46, support the blades laterally, allowing the dissipation of the centrifugal and aerodynamic stresses experienced by the blades while in operation at high speeds.

The equilateral triangular rotor frame 12, forms a rigid structure to support the blades and is supported by an inverted tripod, which is solidly mounted to a ring shaped tower base 15, free to rotate on guiding rollers 51, disposed in a circular pattern on pillars 55. The pivoted airfoil blades 94, 95, 96 have a 360° freedom of rotation and their relative angle of attack is monitored by reference servos 90. The central controller 25 interprets and in turn provides the necessary control to the individual servo motors 20 in reference to information received from the anemometers and tachometer and also preset programmes. By allowing a 360° freedom of the pivoted blades and allowing them to align with the prevailing winds, the impact surface offered by the blades will be minor, when the turbine is stopped. Thus, making it virtually invulnerable to hurricane force winds.

The controller 25 features a selection of Manual, Automatic and control-by-radio signals. The Manal and Radio control mode of operation allows the operator to duplicate all the functions provided in the automatic mode. To start the turbine in the automatic mode, the individual anemometers 30, will provide the controller with the prevailing wind speed. According to a program setting of say, wind speeds in excess of 60 Km/H, if this condition is exceeded, the following will occur. First a mechanical brake 92 is released. Next, the controller aligns the individual pivoted blades to their respective null position (a position of minimum drag at high speed of operation). When this has been achieved, the controller will switch to the next phase, which allows a 90° of freedom of the pivoted blades, permitting them to switch ON and OFF, and the turbine to start as a drag turbine. At a conventional rotor speed, as monitored by the tachometer, the controller will switch to the lift type of operation. In doing so, the controller will once again bring all the blades to a null, and their relative angles of attack will from now on be controlled in reference to their respective anemometers, in order to achieve maximum aerodynamic efficiency.

The multiple output shaft, provided by the individual guiding wheels, is a simple and practical alternative. However, operating the turbine at a constant speed (fixed rotor RPM) in the presence of varying wind speeds, hinders rotor efficiency. The rotor herein permits the control of rotor RPM independently of wind speed. After a specific rotor speed has been achieved for a specific wind speed, in order to maintain rotor RPM in the presence of winds exceeding that FIGURE, either the turbine shall be loaded in proportion (to cause an appropriate amount of slipage), or, the turbine must be detuned in proportion (by offsetting the pivoted airfoil blades to null). Ideally, the fixed RPM FIGURE is related to rotor stress tolerance. Example: assuming the rotor was designed for a maximum of say, 20 RPM and a specific amount of torque X, then the prevailing excess wind energy will be spilled out. These FIGURES, should ideally, exceed those of the mean wind speeds on the local of installation site, to ensure maximum utilization of the prevailing winds. This choice is tied to the frequency of high winds in the installation site, and would allow the turbine to operate at maximum efficiency most of the time, by allowing the turbine to change speed in response to the prevailing winds, within preset limits.

Since the turbine herein envisages large scale energy harnessing, in the range of several megawatts, and since the ring shaped tower base 15, offers a unique frame to form an innovative energy converter, in which a giant ring shaped armature common to a number of plug-in stator modules, allows the transfer of energy to the individual stators by electromagnetic induction, the rotating tower base, forms an Energy Converter by Electromagnetic Induction. While using the basic principles of conventional D.C. generators, the turbine operates in a somewhat different way. In this concept the induction coils 76, are energized by a D.C. voltage applied by means of roller brushes 72, and 73, to the segmented collectors 70, 71. The coils 76 are wound so as to form north poles adjacent to south poles. Only the coils just in front of the individual stators are energized. Since the armature is rotating adjacently to the stator, it produces a moving magnetic field, which induces a voltage in the said stator, in the same way it does in a conventional D.C. generators. The individual stators may be disposed adjacently to the revolving armature, at convenient intervals, and may be switched ON or OFF to the revolving armature, either electrically or electronically, simply by switching the excitation supply.

The turbine herein allows a wide range of alternatives in the method of conveying the harnessed energy. For reasons of simplicity, I will propose the application of a Self-Excited D.C. Generator, to make use of electronic switching, magnetic amplifiers and transformers, allowing the turbine rotor to operate at varying speeds within a wide-band-pass (wind speeds of say, 6 to 60 Km/H, tuned for maximum efficiency), while maintaining a proper output voltage and frequency, in phase with the power grid, if required.

It will be apparent that varying the voltage applied to the armature, will proportionally vary the magnetic density. This effect compares to that of an adjustable clutch, which allows the engagement or disengagement simply by switching ON or OFF the magnetic excitation voltage. Power transfer may be adjusted at will by varying the voltage applied to the induction coils, thus forming a highly versatile and efficient energy transfer medium. One other desirable feature is that the number of individual stator modules electromagnetically engaged to the revolving armature may vary. This allows a number of stand-by stator-modules for coupling in occasions of high winds, or to switch over in the eventuality of break down to be used and monitored by the central control room permitting the control of voltage output and frequency by conventional techniques.

The turbine is a free-standing vertical-axis turbine of highly versatile characteristics. It will start in low winds and when in the presence of winds exceeding the turbine ratings or a specific energy converters program, the excess wind energy will be spilled out, by detuning the turbine in proportion.

While in the automatic mode of operation, assuming the wind speed drops below a programmed speed to sustain a specific RPM, the controller will automatically switch to the drag type of operation in which the pivoted blades will be free to rotate within a 90° frame. A down-timer may be programmed to switch the turbine to the arresting mode of operation, if the turbine did not pick-up operational speed within that period. This arresting of operation mode, will consist in offsetting the pivoted airfoil blades 90° from the null. In this mode, the pivoted blades will operate as aerodynamic brakes. After the turbine has come to a stop, a mechanical brake will be applied to the rotating tower base to ensure a stationary condition, thus completing a cycle. After the turbine has come to a full stop, while in the automatic mode, it will switch to a Stand-By Mode, in which, the anemometers 30, will monitor the prevailing winds. Should the wind speed at any time exceed the minimum preset program, an integrator timer is programmed for a specific integration time, to prevent the turbine from initiating a starting cycle in gusting winds of low frequency.

It will be noted that this turbine herein combines the necessary versatile features to outclass the coefficient of utilization, the variants of power regulation and speed offered by the propeller. While the blades herein do not produce a continuous torque, the whole length of the blades operate in a region of maximum energy for a given rotor diameter. In particular, the length of the blades and their relative distance from the center, will to a great extent determine rotor efficiency in comparison. On the other hand the propeller produces a continuous torque and only its blade-tip operates in a maximum energy region.

What I claim is:

1. A Free-Standing, Self-Starting, Vertical-Axis Rotor for Natural Energy Harnessing comprising; an equilateral triangular frame having a plurality of vertical airfoil blades having bilateral stress dampers to dissipate the centrifugal and aerodynamic stresses and supress blade flutter at high operating speeds; pivoted airfoil blades controlled by servo motors in response to controller signals in reference to anemometer signals in phase with the prevailing winds and in which the angle of attack of the blades is monitored by servomechanisms which also provide input signals to the said controller, allowing for control of the angle of attack of the pivoted blades for aerodynamic efficiency and also allowing the pivoted blades to operate as a drag turbine for self-starting in low wind speeds, further allowing operation as a lift-type turbine for high velocities of rotation and also the pivoted blades to be operated as aerodynamic brakes for arresting of operation; said frame mounted on a ring shaped tower base riding on wheels, said wheels disposed in a circular pattern and mounted on pillars allowing the harnessing of energy at gound level; said ring shaped tower base forming the frame of a ring shaped armature of an electromagnetic energy converter common to a number of stators mounted adjacently to it, to allow transfer of the harnessed energy by electromagnetic induction directly, at ground level.

2. A rotor as in claim 1 having means of supporting the blades laterally by metallic cables, interconnected to the blades by V-shaped and straight brackets, allowing the centrifugal and aerodynamic stresses acting upon the blades to be transferred to the extremes of the said blades and also supress blade flutter at high velocity rotation, by forming a rigid blade structure.

3. A controller as in claim 1, having servo motors and gear mechanisms and clutches to permit control of the pivoted blades individually, and in the Stand-by or OFF mode of operation, to allow the said pivoted blades to align individually with the prevailing currents to offer a minimum impact surface and virtually make the turbine invulnerable to hurricane force currents.

4. A means for modulating the blade angle as claimed in claim 1, having the pivoted airfoil blades angle of attack being changed from a neutral to a specific angle to produce lift in response to signals related to the prevailing winds' direction, to achieve improved rotor efficiency and higher velocity ratios.

5. A turbine rotor as in claim 1, making use of anemometers, to monitor the relative current speeds experienced by the individual blades and relating to an appropriate pitch control of the said blades.

6. A turbine rotor as in claim 1, having the pitch of the blades monitored by servomechanisms, to allow the control of the angle of attack of the said blades to a desired angle individually within a 360° freedom of rotation.

7. A ring shaped tower base forming a modular electromagnetic converter as claimed in claim 1, having a ring shaped revolving armature common to a number of individual stator modules disposed adjacently which can be excited individually and independently, allowing the conveyance of the harnessed energy by electromagnetic induction and in which the said individual stators produce outputs of different voltages, frequencies and number of phases simultaneously.

* * * * *